United States Patent Office 3,610,109
Patented Oct. 5, 1971

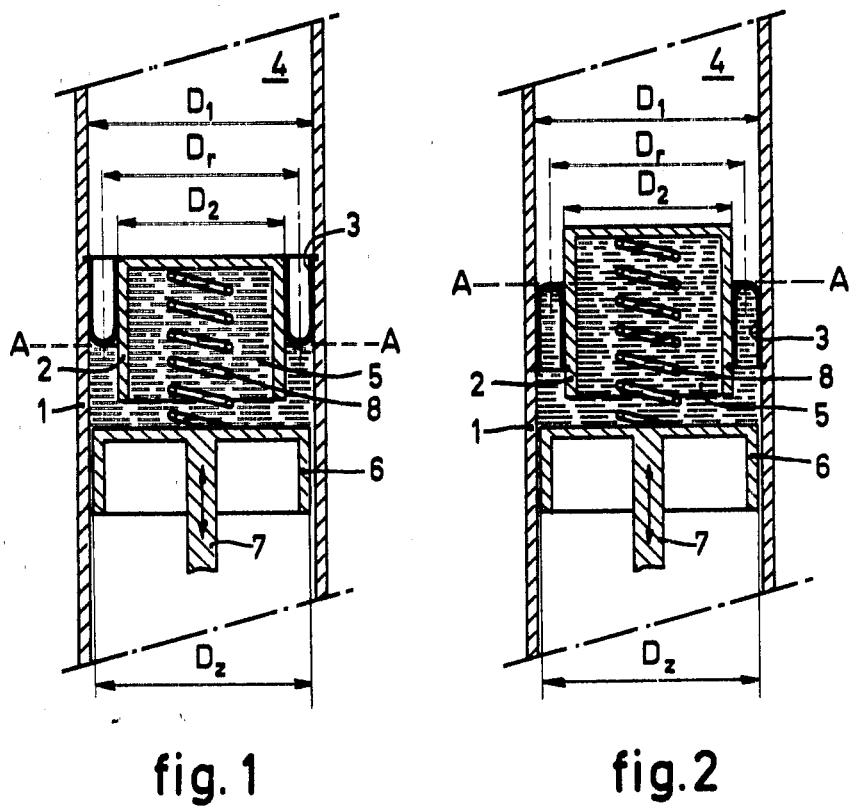

3,610,109
HOT GAS ENGINE
Hendrik Jozef Verbeek, Emmasingel, Eindhoven, Netherlands, assignor to U.S. Philips Corporation, New York, N.Y.
Filed Oct. 29, 1969, Ser. No. 872,159
Claims priority, appplication Netherlands, Nov. 2, 1968, 6815662
Int. Cl. F01b *19/00*
U.S. Cl. 92—98          4 Claims

ABSTRACT OF THE DISCLOSURE

Apparatus with first and second pistons of different diameters axially spaced and movable in a cylinder with a spring disposed between and engaging the pistons, a rolling diaphragm seal between adjacent walls of the first piston and the cylinder, and a column of liquid between the pistons for supporting the seal, these elements proportioned such that the mass inertia forces of the first piston are compensated.

---

The invention relates to a device comprising at least one cylinder accommodating a movable, first piston for varying a working space, a seal between this piston and the cylinder wall formed by at least one rolling diaphragm. The sides of the first piston and of the rolling diaphragm remote from the working space are in contact with a fluid which is in contact with a second piston coupled with a driving gear. The first and the second pistons are interconnected by spring elements, which maintain a pressure difference on the first piston and the rolling diaphragm while precautions are taken to compensate the mass inertia forces of the first piston and of the quantity of fluid contained in the space bounded by the fluid-contacting side of the first piston and the plane, transverse of the centre line of the device and tangential, to the rolling diaphragm in the middle position of the pistons, so that said forces do practically not affect the pressure difference across the rolling diaphragm.

In devices of the kind in accordance with the invention it is important for a satisfactory lifetime of the rolling diaphragm that a constant pressure difference should be maintained across the rolling diaphragm always in the same direction. The desired pressure difference is obtained by exerting, by means of the spring elements, a force on the first piston so that the pressure in the fluid will deviate by a given value from the pressure in the working space.

It has been found that in these devices the mass inertia forces of the first piston, the fluid and the spring elements play a role. These forces produce fluctuations of the pressure difference prevailing across the rolling diaphragm so that the lifetime of the latter is adversely affected.

In a known device of the kind set forth, the mass inertia forces of the first piston and of the quantity of fluid contained in the space bounded by the side of said piston contacting the fluid and the plane, transverse to the centre line of the device, and tangential to the rolling diaphragm are compensated with the aid of a freely movable compensation mass connected with the first piston. The connection between said mass and the first piston is such that the inertia forces of said mass are opposite the mass inertia forces of the first piston.

Although in this way a satisfactory compensation of the mass inertia forces can be achieved, this construction has the disadvantage that an additional, movable mass has to be incorporated in the device, which involves all kinds of structural complications.

The invention is based on the recognition of the fact that compensation of said mass inertia forces can be obtained by choosing a slightly larger diameter of the second piston than the effective diameter of the rolling diaphragm. The term "effective diameter of the rolling diaphragm" has to be understood to mean herein the diameter which corresponds to the root of half the sum of the diameter of the first piston to the square and the diameter of the co-operating part of the cylinder to the square. As a result the distance between the first and second pistons will vary during a stroke and hence also the force exerted by the spring elements on the first piston.

The device according to the invention is characterized in that the diameter ($D_z$) of the second piston, the effective diameter ($D_r$) of the roll membrane, the number of revolutions per minute ($n$) of the drive shaft of the device or cycles per minute of the piston, the spring constant ($C$) of the spring elements and the mass ($m$) formed by the mass of the first piston, the mass of the quantity of fluid contained in the space bounded by the fluid-contacting side of the first piston and the plane, transverse to the centre line of the device, and tangential to the rolling diaphragm in the middle position of the pistons and half the mass of the spring elements satisfy the following relation:

$$\frac{C}{m} = \omega^2 \frac{D_z^2}{D_z^2 - D_r^2}$$

wherein $$\omega = \frac{2\pi n}{60}$$

In this way the appropriate dimensioning of the device provides complete compensation of said mass inertia forces without the need for additional, movable compensation masses.

The invention will be described more fully with reference to the drawing.

FIGS. 1 and 2 show schematically two embodiments of piston-cylinder combinations.

Referring to FIG. 1, reference numeral 1 designates a cylinder. In this cylinder a first piston 2 is adapted to move. The seal between the piston 2 and the cylinder 1 is formed by a rolling diaphragm 3, the hollow side of which faces a working space 4. The piston 2 is in contact by its side remote from the working space 4 with a fluid 5, which is in contact with a piston 6, which is coupled by way of a piston rod 7 with a driving gear (not shown). The pistons 2 and 6 are interconnected by a pressure spring 8. Owing to the forces exerted by the spring 8 on the piston 2, the pressure in the fluid 5 will always be lower by a given value, than that in the working space 4, so that the rolling diaphragm 3 remains stretched.

When the upper or lower dead position is reached, the piston 2 is exposed to a mass inertia force in upward or downward direction respectively so that the pressure in the fluid 5 deviates by a decrease or an increase respectively of the value of:

$$\Delta p_m = \frac{m\omega^2 r}{\frac{\pi}{4} D_r^2}$$

from the undisturbed pressure. In this formula:

$m$=the sum of the mass of piston 2, the mass of the fluid contained between the piston 2 and the plane A—A tangential to the rolling diaphragm in the middle position of the pistons and half the mass of spring 8.
$r$=half the stroke of piston 2.

$$\omega = \frac{2\pi n}{60}$$

wherein $n$ is the number of revolutions per minute of the device.

$D_r$ = the effective diameter of the rolling diaphragm 3, $D_r$ being equal to $\sqrt{\frac{1}{2}(D_2^2 + D_1^2)}$.

$D_2$ = the diameter of piston 2.

$D_1$ = the diameter of the cylinder.

Since, as will be apparent from the drawing, the diameter $D_z$ of piston 6 is larger than the effective diameter $D_r$, the distance between pistons 2 and 6 at the upper dead point will be greater than in the middle position. Consequently, the force by which the pressure spring 8 urges the piston 2 will be lower, which means that a pressure increase $\Delta p_v$ is produced in the fluid 5, which increases exactly compensates the decrease $\Delta p_m$ with correct proportioning. When the lower dead point is reached, the distance between the pistons 2 and 6 is smaller than in the medium position so that the spring 8 exerts a heavier force on piston 2 so that a pressure decrease $\Delta p_v$ is produced in the fluid 5, which with correct proportioning compensates the force $\Delta p_m$ then operating in downward direction.

By proportioning the device so that the condition:

$$\frac{C}{m} = \omega^2 \frac{D_z^2}{D_z^2 - D_r^2}$$

is satisfied a complete compensation of the mass inertia forces is obtained. In this formula:

$C$ = the spring constant of spring 8.

$m$ = the sum of the mass of piston 2, the mass of the fluid contained between the piston 2 and the plane A—A tangential to the rolling diaphragm in the middle position of the pistons 2 and 6 and half of the mass of spring 8.

$$\omega = \frac{2\pi n}{60}$$

$n$ being the number of rotations per minute of the drive shaft or cycles per minute of each piston.

$D_z$ = the diameter of piston 6.

$D_r$ = the effective diameter of the roll membrane 3.

The fact that a complete compensation of the mass inertia forces is achieved may be accounted for as follows.

The pressure fluctuations due to the mass inertia forces is now:

$$\Delta p_m = \frac{mr}{\frac{\pi}{4} D_r^2} \cdot \frac{C}{m} \cdot \frac{D_z^2 - D_r^2}{D_z^2}$$

$$\Delta p_m = Cr \cdot \frac{D_z^2 - D_r^2}{\frac{\pi}{4} \cdot D_r^2 \cdot D_z^2}$$

Half the stroke $r$ of piston 2 is equal to half the stroke $\frac{1}{2} S_z$ of piston 6 plus half the stroke difference $\Delta S$ between piston 2 and piston 6.

The difference in stroke volumes of pistons 2 and 6 is:

$$S_z \cdot \frac{\pi}{4} D_z^2 = S_z \cdot \frac{\pi}{4} D_r^2 + \Delta S \frac{\pi}{4} D_r^2$$

$$\Delta S = S_z \left( \frac{D_z^2 - D_r^2}{D_r^2} \right)$$

It follows therefrom that $r = \frac{1}{2} S_z + \frac{1}{2} \Delta S$.

$$r = \frac{1}{2} S_z \frac{D_z^2}{D_r^2}$$

This results in:

$$\Delta p_m = C \cdot \frac{D_z^2 - D_r^2}{D_r^2} \cdot \frac{1}{2} S_z \cdot \frac{1}{\frac{\pi}{4} D_r^2} \quad (1)$$

Owing to the stroke difference $\Delta S$ between the pistons 2 and 6 the pressure fluctuation owing to the spring force variation becomes:

$$\Delta p_v = \frac{K_v}{\frac{\pi}{4} D_r^2} = C \cdot \frac{1}{2} \Delta S \cdot \frac{1}{\frac{\pi}{4} D_r^2}$$

$$= C \cdot \frac{1}{2} S_z \cdot \frac{D_z^2 - D_r^2}{D_r^2} \cdot \frac{1}{\frac{\pi}{4} D_r^2} \quad (2)$$

From the Formulae 1 and 2 it follows that $\Delta p_m = \Delta p_v$ so that the pressure fluctuations due to the mass inertia forces are completely compensated by the pressure fluctuations owing to the spring force variation.

The foregoing relating to FIG. 1 for a device in which the roll membrane 3 faces the space 4 by its concave side applies in a similar manner to a device of the kind shown in FIG. 2, in which the rolling diaphragm 3 faces the working space 4 by its concave side. The sole difference is that the spring 8 is now a tensile spring, so that the pressure in the fluid 5 is constantly higher by a defined amount than the pressure in the working space 4.

What is claimed is:

1. Apparatus comprising a cylinder having a bore diameter $D_1$, a first piston having outer diameter $D_2$, axially movable within the cylinder to vary the volume of the space above the piston, a rolling diaphragm seal having effective diameter $D_r$, secured between adjacent inner walls of the cylinder and outer walls of said first piston, a second piston having a substantially planer upper surface with a diameter $D_z$ that corresponds to and fits within said bore axially spaced from the first piston, a liquid in the space between the two pistons and communicating with the upper surface of the second piston and the lower surface of the first piston and the seal, and a spring element having spring constant C interconnecting the first and second pistons for maintaining a pressure difference across the first piston and seal, with the above elements proportioned to satisfy the following equation:

$$\frac{C}{m} = \omega^2 \frac{(D_z)^2}{(D_z)^2 - (D_r)^2}$$

where $D_2 < D_1$, $D_2 < D_r < D_1$, $$\omega = \frac{2\pi n}{60}$$

$n$ being the number of cycles per minute of the pistons, and $m$ = the sum of the mass of the first piston, the mass of the liquid contained between the first piston and the plane A—A tangential to the seal in the middle position of the pistons, and half the mass of the spring, for compensating the mass inertia forces of the first piston and said mass of liquid, and thus prevent said forces from adversely effecting the pressure difference across the seal.

2. Apparatus comprising a cylinder, first and second axially spaced pistons axially movable in the cylinder, the first piston having smaller diameter than the second, a rolling diaphragm seal secured between adjacent walls of the first piston and the cylinder, a column of liquid within said cylinder and bounded at its lower end by said second piston and at its upper end by the first piston and seal, and a spring member disposed between and engaging said two pistons for maintaining a pressure difference across the first piston and seal, with the above elements proportioned to satisfy the following equation:

$$\frac{C}{m} = \omega^2 \frac{D_z^2}{D_z^2 - D_r^2}$$

where

C = the spring constant,
$D_r$ = the effective diameter of the seal,
$D_z$ = the diameter of the second piston, $$\omega = \frac{2\pi n}{60}$$

$n$ being the number of cycles per minute of the pistons, and $m$ = the sum of the mass of the first piston, the mass of liquid contained between the first piston and the plane A—A tangential to the seal in the middle position of the pistons, and half the mass of the spring.

3. Apparatus according to claim 2 wherein the seal forms a convex surface in contact with the liquid.

4. Apparatus according to claim 2 wherein the seal forms a concave surface in contact with the liquid.

References Cited

UNITED STATES PATENTS

| | | | |
|---|---|---|---|
| 3,277,795 | 10/1966 | Rietdijk | 92—84 |
| 3,339,464 | 9/1967 | Rietdijk | 92—84 |
| 3,372,624 | 3/1968 | Rietdijk | 92—98 |

MARTIN P. SCHWARDRON, Primary Examiner

A. M. ZUPCIC, Assistant Examiner

U.S. Cl. X.R.

92—84